United States Patent
Wang

(10) Patent No.: US 10,200,204 B2
(45) Date of Patent: Feb. 5, 2019

(54) LINK STATE INFORMATION ADVERTISEMENT METHOD AND DEVICE

(71) Applicant: HUAWEI TECHNOLOGIES CO., LTD., Shenzhen (CN)

(72) Inventor: Lixing Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 15/443,385

(22) Filed: Feb. 27, 2017

(65) Prior Publication Data

US 2017/0171058 A1   Jun. 15, 2017

Related U.S. Application Data

(63) Continuation of application No. PCT/CN2015/088277, filed on Aug. 27, 2015.

(30) Foreign Application Priority Data

Aug. 30, 2014   (CN) .......................... 2014 1 0438928

(51) Int. Cl.
*H04L 12/18* (2006.01)
*H04L 12/761* (2013.01)
(Continued)

(52) U.S. Cl.
CPC .............. *H04L 12/18* (2013.01); *H04L 41/12* (2013.01); *H04L 45/02* (2013.01); *H04L 45/16* (2013.01);
(Continued)

(58) Field of Classification Search
CPC ......... H04L 45/22; H04L 45/02; H04L 45/28; H04L 12/18; H04L 45/16; H04L 45/50
See application file for complete search history.

(56) References Cited

U.S. PATENT DOCUMENTS 9,100,328 B1 * 8/2015 Atlas ....................... H04L 45/28
9,178,801 B1 * 11/2015 Guichard ............ H04L 12/6418
(Continued)

FOREIGN PATENT DOCUMENTS

CN        101009702 A       8/2007
CN        101330448 A      12/2008
(Continued)

OTHER PUBLICATIONS

Extended European Search Report dated Sep. 8, 2017 in corresponding European Patent Application No. 15835964.5.
(Continued)

*Primary Examiner* — Raj Jain
(74) *Attorney, Agent, or Firm* — Staas & Halsey LLP

(57) ABSTRACT

The present application discloses a link state information advertisement method and device, including: receiving, by a first network device, network topology information sent by a control device, where the network topology information includes link state information, which is generated by the control device, between the first network device and a second network device, the first network device supports an IGP, and the second network device does not support the IGP; and advertising the link state information between the first network device and the second network device. The first network device advertises the link state information to other network devices supporting the IGP, therefore implementing that a network device supporting the IGP in multiple network devices controlled by one control device accesses a network device not supporting the IGP, thereby optimizing routing between multiple network devices controlled by the control device.

18 Claims, 6 Drawing Sheets

(51) Int. Cl.
*H04L 12/24* (2006.01)
*H04L 12/751* (2013.01)
*H04L 12/775* (2013.01)
*H04L 12/721* (2013.01)
*H04L 12/781* (2013.01)
*H04L 12/717* (2013.01)
*H04L 12/715* (2013.01)

(52) U.S. Cl.
CPC .............. *H04L 45/42* (2013.01); *H04L 45/44* (2013.01); *H04L 45/52* (2013.01); *H04L 45/58* (2013.01); *H04L 45/64* (2013.01)

(56) References Cited

U.S. PATENT DOCUMENTS

| | | | |
|---|---|---|---|
| 9,571,387 B1* | 2/2017 | Atlas | H04L 45/50 |
| 2013/0064127 A1 | 3/2013 | Wang et al. | |
| 2014/0146828 A1 | 5/2014 | Kini et al. | |
| 2015/0146536 A1* | 5/2015 | Minei | H04L 45/507 |
| | | | 370/236 |
| 2015/0304218 A1 | 10/2015 | Wang et al. | |
| 2017/0171058 A1* | 6/2017 | Wang | H04L 41/12 |

FOREIGN PATENT DOCUMENTS

| | | |
|---|---|---|
| CN | 101453405 A | 6/2009 |
| CN | 101547139 A | 9/2009 |
| CN | 102263688 A | 11/2011 |
| CN | 102437932 A | 5/2012 |
| CN | 102664809 A | 9/2012 |
| CN | 103036756 A | 4/2013 |
| WO | 2014/106387 A1 | 7/2014 |

OTHER PUBLICATIONS

Sugam Agarwal et al.: "Traffic Engineering in Software Defined Networks," Apr. 14, 2013, 9 pages, XP032440983.
Chinese Office Action dated Feb. 24, 2018 in corresponding Chinese Patent Application No. 201410438928.8, 6 pgs.
International Search Report dated Dec. 16, 2015 in corresponding International Patent Application No. PCT/CN2015/088277.
J. Moy, "OSPF Version 2," Ascend Communications, Inc., Network Working Group, Request for Comments: 2328, Apr. 1998.
A. Lindem et al. "Extensions to OSPF for Advertising Optional Router Capabilities," Redback Networks et al., Network Working Group, Request for Comments: 4970, Jul. 2007.
M. Chen et al. "ISIS Extensions in Support of Inter-Autonomous System (AS) MPLS and GMPLS Traffic Engineering," Huawei Technologies Co., Ltd et al., Network Working Group, Request for Comments: 5316, Dec. 2008.
International Search Report dated Dec. 16, 2015 in corresponding International Application No. PCT/CN2015/088277.

* cited by examiner

LINK STATE INFORMATION ADVERTISEMENT METHOD AND DEVICE

CROSS-REFERENCE TO RELATED APPLICATIONS

This application is a continuation of International Application No. PCT/CN2015/088277, filed on Aug. 27, 2015, which claims priority to Chinese Patent Application 201410438928.8, filed on Aug. 30, 2014. The disclosures of the aforementioned applications are hereby incorporated by reference in their entireties.

TECHNICAL FIELD

The present application relates to the field of software defined networking SDN technologies, and in particular, to a link state information advertisement method and device.

BACKGROUND

In a software defined networking (English: Software Defined Networking, SDN for short) scenario, different control points support different protocols. For example, a control point controlling a forwarding table supports the OpenFlow (OpenFlow) protocol; a control point controlling a routing table supports the Interface to the Routing System (English: Interface to the Routing System, I2RS for short) protocol.

Currently, an Interior Gateway Protocol (English: Interior Gateway Protocol, IGP for short) is proposed in the SDN scenario. The IGP is a protocol for exchanging data stream channel information between gateways in an autonomous network system.

In an actual application, in multiple network devices controlled by one control device, some network devices support the IGP, and some network devices do not support the IGP because of relatively low hardware configurations. Network devices supporting the IGP cannot access network devices not supporting the IGP.

Therefore, for multiple network devices controlled by one control device, how to enable a network device supporting the IGP to access a network device not supporting the IGP becomes an urgent problem that needs to be resolved.

SUMMARY

In view of this, embodiments of the present application provide a link state information advertisement method and device, to resolve a problem that a network device supporting an IGP in multiple network devices controlled by one control device cannot access a network device not supporting the IGP.

According to a first aspect of the present application, a link state information advertisement method is provided, including:

receiving, by a first network device, network topology information sent by a control device, where the network topology information includes link state information, which is generated by the control device, between the first network device and a second network device, the first network device supports an interior gateway protocol IGP, and the second network device does not support the IGP; and advertising, by the first network device, the link state information, which is carried in the network topology information, between the first network device and the second network device.

With reference to possible implementation manners of the first aspect of the present application, in a first possible implementation manner, the advertising, by the first network device, the link state information between the first network device and the second network device includes:

storing, by the first network device into a link state database, the link state information, which is carried in the network topology information, between the first network device and the second network device; and for the current link state database, advertising, by the first network device, a link state advertisement LSA, where the LSA includes the link state information between the first network device and the second network device and link state information between the first network device and another network device supporting the IGP.

With reference to possible implementation manners of the first aspect of the present application or with reference to the first possible implementation manner of the first aspect of the present application, in a second possible implementation manner, the receiving, by a first network device, network topology information sent by a control device includes:

receiving, by the first network device, the network topology information that is sent by the control device based on an Interface to the Routing System I2RS protocol.

With reference to possible implementation manners of the first aspect of the present application, in a third possible implementation manner, the network topology information further includes an identifier of the control device; and the receiving, by a first network device, network topology information sent by a control device includes:

receiving, by the first network device, the network topology information that is sent by the control device based on an extended IGP.

With reference to the third possible implementation manner of the first aspect of the present application, in a fourth possible implementation manner, the advertising, by the first network device, the link state information between the first network device and the second network device includes:

storing, by the first network device into a link state database, the link state information, which is included in the network topology information, between the first network device and the second network device; and for the current link state database, advertising, by the first network device, a link state advertisement LSA, where the LSA includes the link state information between the first network device and the second network device and link state information between the first network device and another network device supporting the IGP.

With reference to the third possible implementation manner of the first aspect of the present application, in a fifth possible implementation manner, the network topology information further includes link state information between the first network device and another network device supporting the IGP; and correspondingly, the method further includes: advertising, by the first network device, the link state information, which is carried in the network topology information, between the first network device and the another network device supporting the IGP.

With reference to the fifth possible implementation manner of the first aspect of the present application, in a sixth possible implementation manner, the method further includes:

preferentially performing, by the first network device, routing calculation according to the link state information carried in the network topology information.

With reference to the third possible implementation manner of the first aspect of the present application, with reference to the fourth possible implementation manner of the first aspect of the present application, with reference to the fifth possible implementation manner of the first aspect of the present application, or with reference to the sixth possible implementation manner of the first aspect of the present application, in a seventh possible implementation manner, after the receiving, by a first network device, network topology information sent by a control device, and before the advertising, by the first network device, the link state information between the first network device and the second network device, the method further includes:

determining, by the first network device, that the identifier of the control device included in the received network topology information is the same as a locally stored identifier of the control device.

With reference to the third possible implementation manner of the first aspect of the present application, with reference to the fourth possible implementation manner of the first aspect of the present application, with reference to the fifth possible implementation manner of the first aspect of the present application, with reference to the sixth possible implementation manner of the first aspect of the present application, or with reference to the seventh possible implementation manner of the first aspect of the present application, in an eighth possible implementation manner, the extended IGP includes an extended router link state advertisement Router-LSA and an extended network link state advertisement Network-LSA.

According to a second aspect of the present application, a link state information advertisement device is provided, including:

a receiving module, configured to receive network topology information sent by a control device, where the network topology information includes link state information, which is generated by the control device, between the first network device and a second network device, the first network device supports an interior gateway protocol IGP, and the second network device does not support the IGP; and an advertisement module, configured to advertise the link state information, which is carried in the network topology information and which is received by the receiving module, between the first network device and the second network device.

With reference to possible implementation manners of the second aspect of the present application, in a first possible implementation manner, the advertisement module is specifically configured to: store, by the first network device into a link state database, the link state information, which is carried in the network topology information, between the first network device and the second network device; and for the current link state database, advertise a link state advertisement LSA, where the LSA includes the link state information between the first network device and the second network device and link state information between the first network device and another network device supporting the IGP.

With reference to possible implementation manners of the second aspect of the present application or with reference to the first possible implementation manner of the second aspect of the present application, in a second possible implementation manner, the receiving module is specifically configured to receive the network topology information that is sent by the control device based on an Interface to the Routing System I2RS protocol.

With reference to possible implementation manners of the second aspect of the present application, in a third possible implementation manner, the network topology information further includes an identifier of the control device; and the receiving module is specifically configured to receive the network topology information that is sent by the control device based on an extended IGP.

With reference to the third possible implementation manner of the second aspect of the present application, in a fourth possible implementation manner, the advertisement module is specifically configured to: store, into a link state database, the link state information, which is included in the network topology information, between the first network device and the second network device; and for the current link state database, advertise a link state advertisement LSA, where the LSA includes the link state information between the first network device and the second network device and link state information between the first network device and another network device supporting the IGP.

With reference to the third possible implementation manner of the second aspect of the present application, in a fifth possible implementation manner, the network topology information further includes link state information between the first network device and another network device supporting the IGP; and the advertisement module is further configured to advertise the link state information, which is carried in the network topology information, between the first network device and the another network device supporting the IGP.

With reference to the fifth possible implementation manner of the second aspect of the present application, in a sixth possible implementation manner, the link state information advertisement device further includes:

a routing calculation module, configured to preferentially perform routing calculation according to the link state information carried in the network topology information.

With reference to the third possible implementation manner of the second aspect of the present application, with reference to the fourth possible implementation manner of the second aspect of the present application, with reference to the fifth possible implementation manner of the second aspect of the present application, or with reference to the sixth possible implementation manner of the second aspect of the present application, in a seventh possible implementation manner, the link state information advertisement device further includes: a determining module, where the determining module is configured to: after the receiving module receives the network topology information sent by the control device and before the advertisement module advertises the link state information between the first network device and the second network device, determine that the identifier of the control device included in the received network topology information is the same as a locally stored identifier of the control device.

With reference to the third possible implementation manner of the second aspect of the present application, with reference to the fourth possible implementation manner of the second aspect of the present application, with reference to the fifth possible implementation manner of the second aspect of the present application, with reference to the sixth possible implementation manner of the second aspect of the present application, or with reference to the seventh possible implementation manner of the second aspect of the present application, in an eighth possible implementation manner, the extended IGP includes an extended router link state advertisement Router-LSA and an extended network link state advertisement Network-LSA.

The present application has the following beneficial effects:

In the embodiments of the present application, a first network device receives network topology information sent by a control device, and the network topology information includes link state information, which is generated by the control device, between the first network device and a second network device, the first network device supports an interior gateway protocol IGP, and the second network device does not support the IGP. The first network device advertises the link state information, which is carried in the network topology information, between the first network device and the second network device. The first network device obtains, by using the control device, the link state information between the first network device and the second network device not supporting the IGP, and advertises the link state information to other network devices supporting the IGP, therefore implementing that a network device supporting the IGP in multiple network devices controlled by one control device accesses a network device not supporting the IGP.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 2 (c) is a format chart of a packet header of an extended Router-LSA-type protocol packet;

FIG. 2 (d) is a format chart of a protocol packet obtained by extended TLVs by using an extended Router-LSA type;

FIG. 2 (e) is a format chart corresponding to an attribute field in FIG. 2 (d);

DESCRIPTION OF EMBODIMENTS

To achieve an objective of the present application, embodiments of the present application provide a link state information advertisement method and device. A first network device receives network topology information sent by a control device, and the network topology information includes link state information, which is generated by the control device, between the first network device and a second network device, the first network device supports an interior gateway protocol IGP, and the second network device does not support the IGP. The first network device advertises the link state information, which is carried in the network topology information, between the first network device and the second network device. The first network device obtains, by using the control device, the link state information between the first network device and the second network device not supporting the IGP, and advertises the link state information to other network devices supporting the IGP, therefore implementing that a network device supporting the IGP in multiple network devices controlled by one control device accesses a network device not supporting the IGP.

The following further describes the embodiments of the present application in detail with reference to this specification. Apparently, the described embodiments are merely some but not all of the embodiments of the present application. All other embodiments obtained by a person of ordinary skill in the art based on the embodiments of the present application without creative efforts shall fall within the protection scope of the present application.

Embodiment 1

Figure 1:
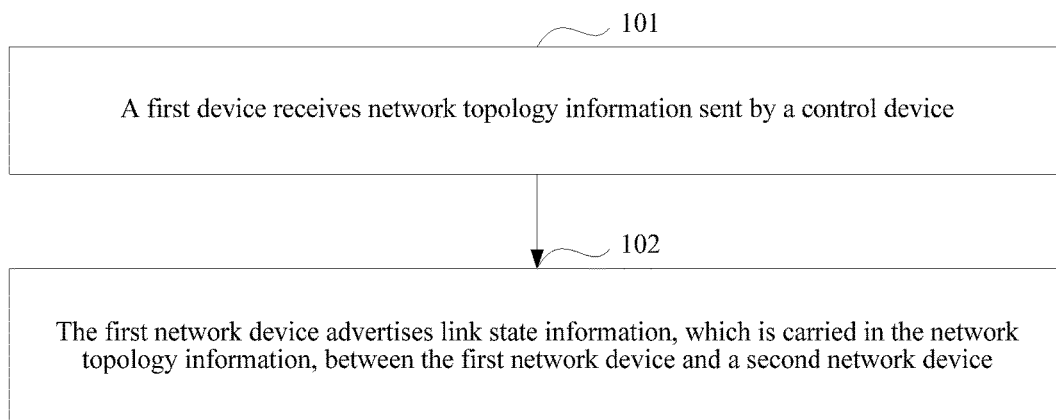
FIG. 1 is a schematic flowchart of a link state information advertisement method according to Embodiment 1 of the present application.

As shown in FIG. 1, FIG. 1 is a schematic flowchart of a link state information advertisement method according to Embodiment 1 of the present application. The method may be described as follows:

Step 101: A first device receives network topology information sent by a control device.

The network topology information includes link state information, which is generated by the control device, between the first network device and a second network device, the first network device supports an IGP, and the second network device does not support the IGP.

The link state information includes at least one or more of a port, a link type, or a bandwidth.

In step 101, the control device controls a network device set to which the first network device belongs, and controls a network device set to which the second network device belongs.

Network devices included in the network device set to which the first network device belongs support the IGP, and network devices included in the network device set to which the second network device belongs do not support the IGP.

Because two network device sets cannot support the IGP together, the first network device cannot access the second network device. It means that a routing path does not exist between the first network device and the second network device.

As a control device shared by the first network device and the second network device, the control device can obtain information about the first network device, such as an Internetwork Protocol (English: Internetwork Protocol, IP for short) address and a port, can also obtain information about the second network device, such as an IP address and a port, and can further generate link state information between the first network device and the second network device.

It should be noted that the link state information between the first network device and the second network device may include bidirectional link state information, that is, link state information from the first network device to the second network device when the first network device serves as an advertiser, and link state information from the second network device to the first network device when the second network device serves as an advertiser.

To implement that the first network device can access the second network device, a routing path is created between the first network device and the second network device, and the control device sends the network topology information to the first network device, to notify the first network device of the link state information between the first network device and the second network device.

Specifically, the first network device receives the network topology information that is sent by the control device based on the Interface to the Routing System I2RS protocol.

Step 102: The first network device advertises link state information, which is carried in the network topology information, between the first network device and a second network device.

In step 102, the first network device stores, into a link state database of the first network device, the link state information, which is carried in the network topology information, between the first network device and the second network device.

For the current link state database, the first network device advertises a link state advertisement (English: Link State Advertisement, LSA for short).

The LSA includes the link state information, which is carried in the network topology information, between the first network device and the second network device and link state information between the first network device and another network device supporting the IGP.

It should be noted that an IGP domain may be an Open Shortest Path First (English: Open Shortest Path First, OSPF for short) protocol domain or may be an Intermediate System to Intermediate System (Intermediate System to Intermediate System, ISIS for short) protocol domain. This is not limited herein.

By means of the solution of Embodiment 1 of the present application, a first network device receives network topology information sent by a control device, and the network topology information includes link state information, which is generated by the control device, between the first network device and a second network device, the first network device supports an interior gateway protocol IGP, and the second network device does not support the IGP. The first network device advertises the link state information, which is carried in the network topology information, between the first network device and the second network device. The first network device obtains, by using the control device, the link state information between the first network device and the second network device not supporting the IGP, and advertises the link state information to other network devices supporting the IGP, therefore implementing that a network device supporting the IGP in multiple network devices controlled by one control device accesses a network device not supporting the IGP.

Embodiment 2

Figure 2:
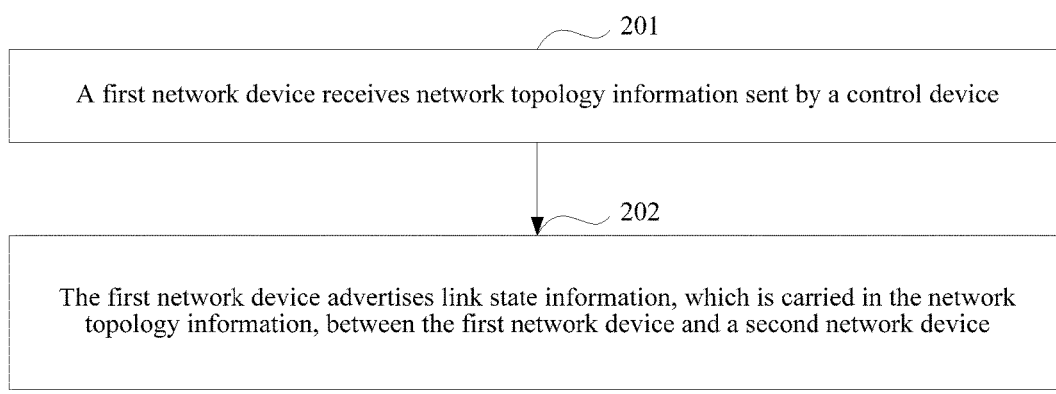
FIG. 2 is a schematic flowchart of a link state information advertisement method according to Embodiment 2 of the present application.

As shown in FIG. 2, FIG. 2 is a schematic structural diagram of a link state information advertisement method according to Embodiment 2 of the present application. The method may be described as follows:

Step 201: A first network device receives network topology information sent by a control device.

The network topology information includes an identifier of the control device and link state information, which is generated by the control device, between the first network device and a second network device.

In step 201, when receiving the network topology information sent by the control device, the first network device determines whether the identifier of the control device carried in the network topology information is the same as a locally stored identifier of the control device.

When the identifier of the control device carried in the network topology information is the same as the locally stored identifier of the control device, subsequent operations are executed.

It should be understood that the network topology information includes a device identifier of a network device corresponding to the link state information generated by the control device (that is, a device identifier of the first network device and a device identifier of the second network device in this embodiment of the present application).

When receiving the network topology information sent by the control device, the first network device determines, according to a device identifier of a network device carried in the network topology information, whether the link state information generated by the control device is related to the first network device.

Specifically, when the device identifier of the network device carried in the network topology information is the same as the device identifier of the first network device, it is determined that the link state information generated by the control device is related to the first network device.

When the device identifier of the network device carried in the network topology information is not the same as the device identifier of the first network device, it is determined that the link state information generated by the control device is not related to the first network device.

Specifically, the first network device receives the network topology information that is sent by the control device based on an extended IGP.

It should be noted that the extended IGP involved herein differs from a standard IGP in that:

The extended IGP involved in this embodiment of the present application includes a field corresponding to the identifier of the control device, so that a network device supporting the IGP can obtain the identifier of the control device, such as Router-ID.

For example, extension of the IGP protocol packet may be implemented by extending an OSPF protocol packet shown in the following figure or may be implemented by extending another protocol packet. This is not specifically limited herein.

It should be noted that the extended IGP includes an extended OSPF protocol packet header, and further includes an extended Router-LSA type and an extended Network-LSA type.

For example, a TLV field is added to an OSPF RFC4970 protocol packet header, and content of the added TLV field is used to represent an identifier of a control device of a network device supporting the IGP.

Figure 2A:
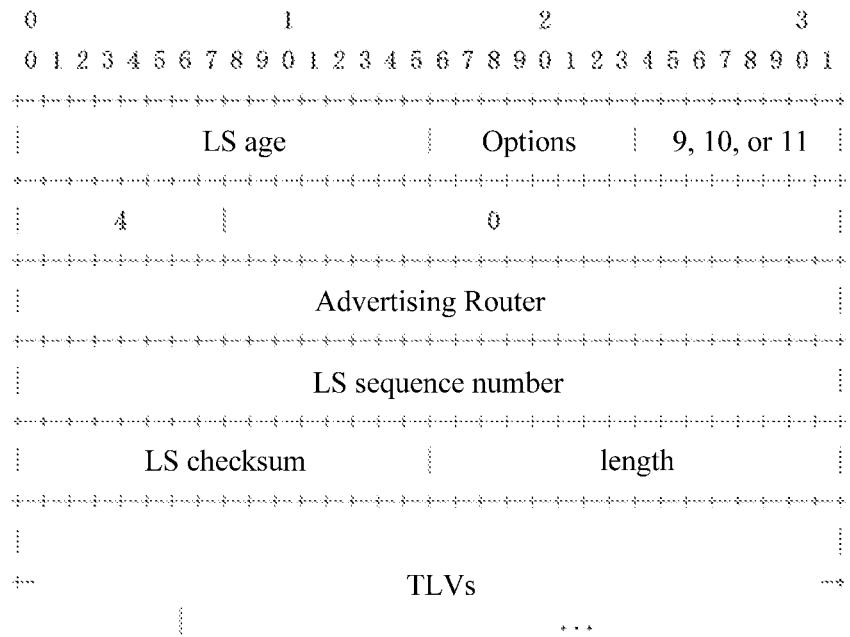
FIG. 2(a) is a format chart of an extended OSPF RFC4970 protocol packet.

FIG. 2(a) is a format chart of an extended OSPF RFC4970 protocol packet.

It can be seen from FIG. 2(a) that the OSPF RFC4970 protocol packet includes: a packet type (that is, an Opaque Type is 4, indicating that it is a No. 4 packet in an OSPF RFC4970 protocol); a packet identifier (that is, an Opaque ID, corresponding to 0); an advertising router (Advertising Router) identifier; a link state sequence number (LS Sequence Number); a link state checksum (LS Checksum); and a length (Length) and TLVs.

Figure 2B:
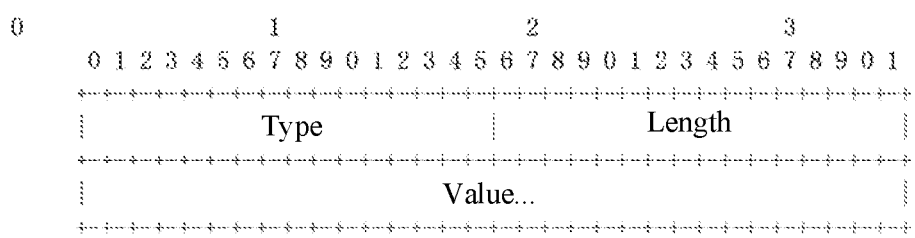
FIG. 2(b) is a format chart of extended TLVs in an extended OSPF RFC4970 protocol packet.

FIG. 2(b) is a format chart of extended TLVs in an extended OSPF RFC4970 protocol packet.

It can be seen from FIG. 2 (b) that the extended TLVs include: a type field (for example, content of the Type field may be 1, 2, 3, or the like; it can be defined that 1 represents that content corresponding to Value is the identifier of the control device); a length field (that is, Length, representing that the content corresponding to Value occupies 4 bytes); and an attribute field (that is, Value, which may correspond to content 1.1.1, representing specific content of the identifier of the control device).

It should be noted that generally, the No. 4 packet is sent to a network device supporting the IGP by the control device during system initialization, so that the network device supporting the IGP obtains a device identifier of the control device.

FIG. 2 (c) is a format chart of a packet header of an extended Router-LSA-type protocol packet.

Figure 2C:
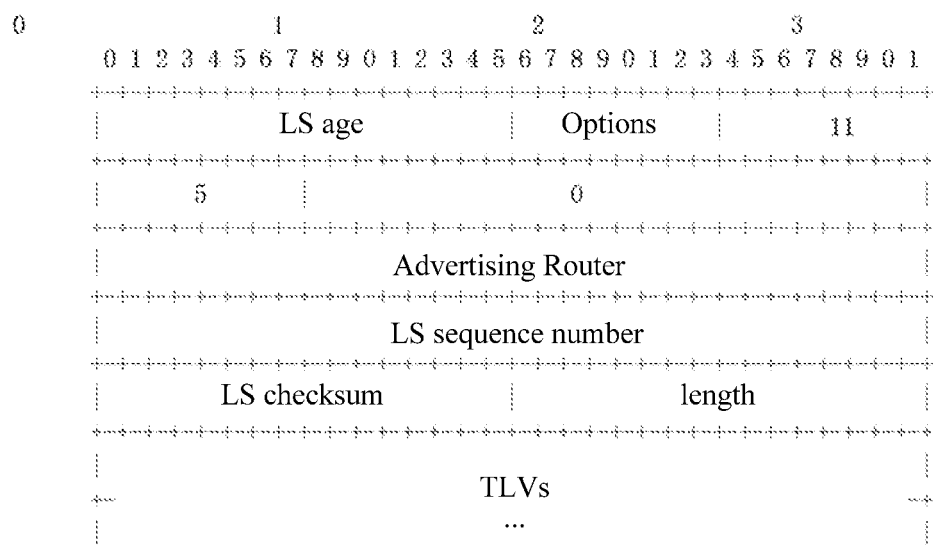
Figure 2D:
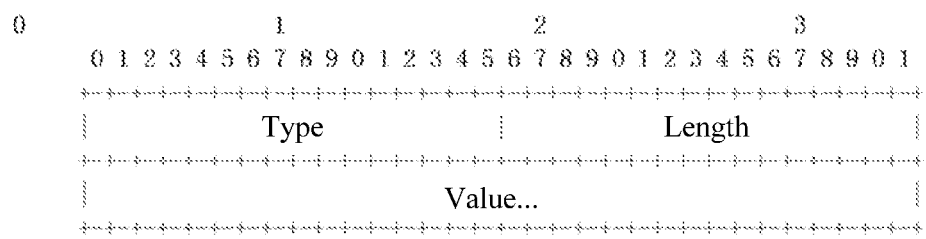
Figure 2E:
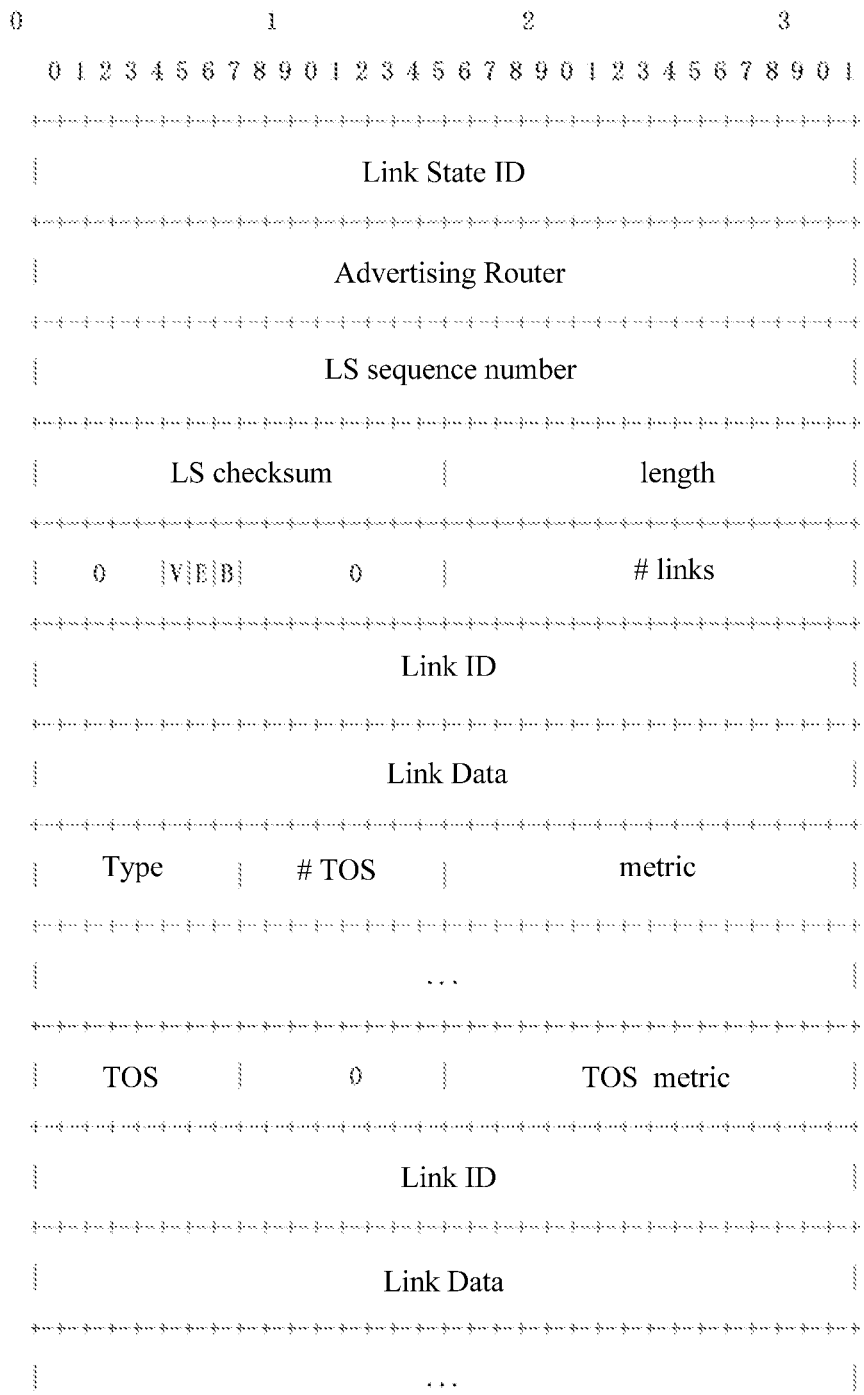

It can be seen from FIG. 2(c) that the packet header of the extended Router-LSA-type protocol packet includes: a packet type (that is, an Opaque Type is 5, indicating that it is an extended Router-LSA-type No. 5 packet in an OSPF protocol); a packet identifier (that is, an Opaque ID, corresponding to 0); an advertising router identifier (Advertising Router); a link state sequence number (LS Sequence Number); a link state checksum (LS Checksum); and a length (Length) and extended TLVs.

It should be noted that the advertising router identifier may be used to represent the identifier of the control device.

FIG. 2 (d) is a format chart of a protocol packet obtained by extended TLVs by using an extended Router-LSA type.

It can be seen from FIG. 2 (d) that the extended TLVs includes: a type field (Type: 1, indicating expanding an LSA of a first class); a length field (Length); and an attribute field (Value, as shown in FIG. 2 (e)).

FIG. 2 (e) is a format chart corresponding to an attribute field in FIG. 2 (d).

It can be seen from FIG. 2 (e) that the attribute field includes: a link state identifier (that is, Link State ID); an advertising router identifier (Advertising Router); a link state sequence number (LS Sequence Number); a link state checksum (LS Checksum); a length (Length); a link identifier (that is, Link ID); link data (that is, Link Data), and the like.

It should be noted that the advertising router identifier may be the device identifier of the first network device or may be the device identifier of the second network device. When the control device sends packets to the first network device by using the extended IGP, an advertising router identifier of one packet may be the device identifier of the first network device; an advertising router identifier of another packet may be the device identifier of the second network device, that is, one packet carries a device identifier of one network device.

It should be noted that the extended TLVs may be obtained by using a Network-LSA type or a Summary-LSA in addition to the extended Router-LSA type.

Step 202: The first network device advertises link state information, which is carried in the network topology information, between the first network device and a second network device.

The first network device stores, into a link state database, the link state information, which is included in the network topology information, between the first network device and the second network device.

For the current link state database, the first network device advertises a link state advertisement LSA, where the LSA includes the link state information between the first network device and the second network device and link state information between the first network device and another network device supporting the IGP.

The first network device obtains, by using the control device, the link state information between the first network device and the second network device not supporting the IGP, and advertises the link state information to other network devices supporting the IGP, therefore implementing that a network device supporting the IGP in multiple network devices controlled by one control device accesses a network device not supporting the IGP.

Embodiment 3

Figure 3:
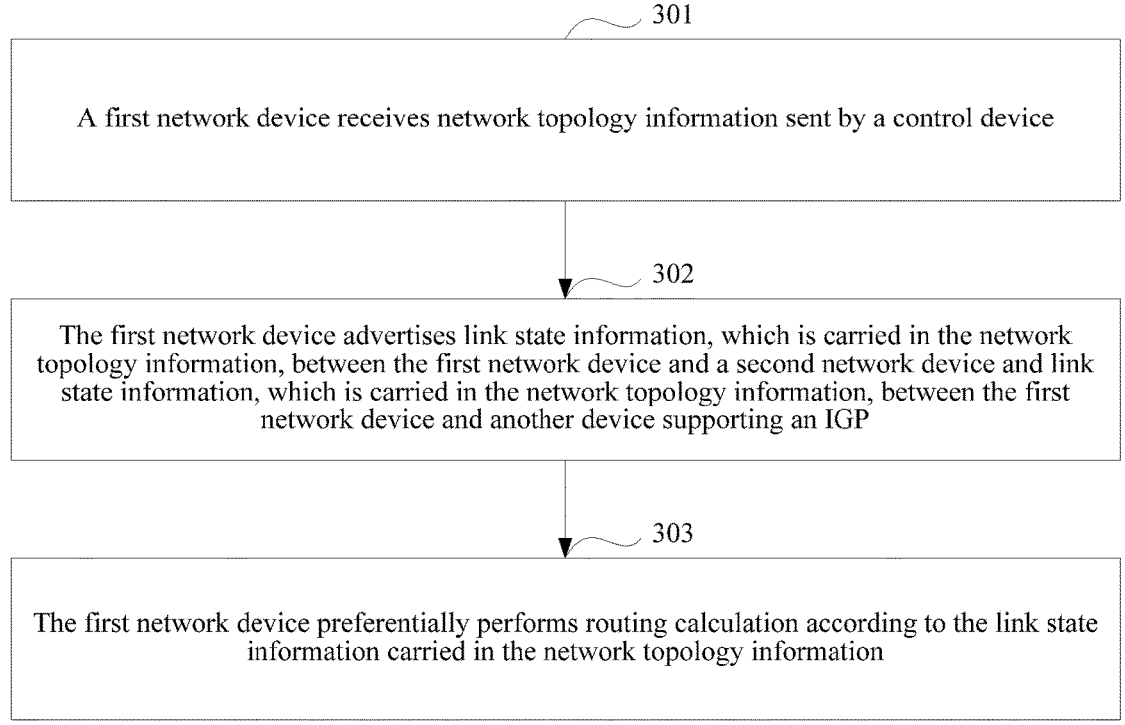
FIG. 3 is a schematic structural diagram of a link state information advertisement method according to Embodiment 3 of the present application.

As shown in FIG. 3, FIG. 3 is a schematic structural diagram of a link state information advertisement method according to Embodiment 3 of the present application. The method may be described as follows:

Step 301: A first network device receives network topology information sent by a control device.

The network topology information includes an identifier of the control device, link state information, which is generated by the control device, between the first network device and a second network device, and link state information between the first network device and another network device supporting an IGP.

In step 301, when receiving the network topology information sent by the control device, the first network device determines whether the identifier of the control device carried in the network topology information is the same as a locally stored identifier of the control device.

When the identifier of the control device carried in the network topology information is the same as the locally stored identifier of the control device, subsequent operations are executed.

It should be understood that the network topology information includes a device identifier of a network device corresponding to the link state information generated by the control device (that is, a device identifier of the first network device and a device identifier of the second network device in this embodiment of the present application).

When receiving the network topology information sent by the control device, the first network device determines, according to a device identifier of a network device carried in the network topology information, whether the link state information generated by the control device is related to the first network device.

Specifically, when the device identifier of the network device carried in the network topology information is the same as the device identifier of the first network device, it is determined that the link state information generated by the control device is related to the first network device.

When the device identifier of the network device carried in the network topology information is not the same as the device identifier of the first network device, it is determined that the link state information generated by the control device is not related to the first network device.

Specifically, the first network device receives the network topology information that is sent by the control device based on an extended IGP.

It should be noted that the manner of the extended IGP involved in Embodiment 3 of the present application is the same as that of the extended IGP involved in Embodiment 2 of the present application, and is not described in detail herein.

Step 302: The first network device advertises link state information, which is carried in the network topology information, between the first network device and a second network device and link state information, which is carried in the network topology information, between the first network device and another device supporting an IGP.

In step 302, the first network device advertises, by using an LSA, the link state information, which is carried in the network topology information, between the first network device and the second network device and the link state information, which is carried in the network topology information, between the first network device and the another device supporting the IGP.

The LSA herein may be generated by the control device on behalf of the first network device. That is, the LSA describes the link state information between the first network device and the second network device and the link state information between the first network device and the another device supporting the IGP.

Step 303: The first network device preferentially performs routing calculation according to the link state information carried in the network topology information.

In step 303, when performing routing calculation, the first network device preferentially selects the link state information carried in the network topology information sent by the control device to perform routing calculation.

The first network device obtains, by using the control device, the link state information between the first network device and the second network device not supporting the IGP, and advertises the link state information to other network devices supporting the IGP, therefore implementing that a network device supporting the IGP in multiple network devices controlled by one control device accesses a network device not supporting the IGP, thereby optimizing routing between the multiple network devices controlled by the control device.

Embodiment 4

Figure 4:
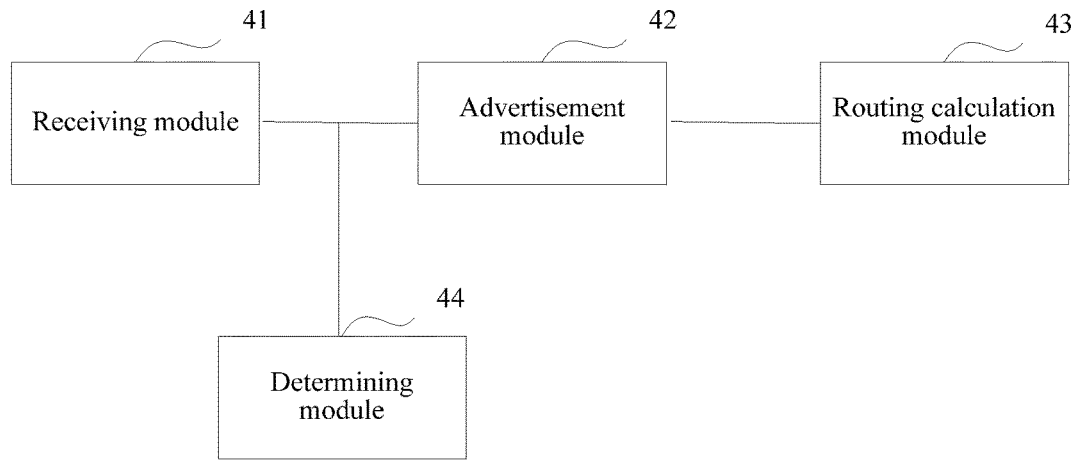
FIG. 4 is a schematic structural diagram of a link state information advertisement device according to Embodiment 4 of the present application.

As shown in FIG. 4, FIG. 4 is a schematic structural diagram of a link state information advertisement device according to Embodiment 4 of the present application. The link state information advertisement device has functions described in Embodiments 1 to 3 of the present application respectively. The link state information advertisement device includes: a receiving module 41 and an advertisement module 42.

The receiving module 41 is configured to receive network topology information sent by a control device, where the network topology information includes link state information, which is generated by the control device, between the first network device and a second network device, the first network device supports an interior gateway protocol IGP, and the second network device does not support the IGP.

The advertisement module 42 is configured to advertise the link state information, which is carried in the network topology information and which is received by the receiving module, between the first network device and the second network device.

A first application scenario is:

The advertisement module 42 is specifically configured to: store, by the first network device into a link state database, the link state information, which is carried in the network topology information, between the first network device and the second network device; and for the current link state database, advertise a link state advertisement LSA, where the LSA includes the link state information between the first network device and the second network device and link state information between the first network device and another network device supporting the IGP.

The receiving module 41 is specifically configured to receive the network topology information that is sent by the control device based on the Interface to the Routing System I2RS protocol.

A second application scenario is:

The network topology information further includes an identifier of the control device.

The receiving module 41 is specifically configured to receive the network topology information that is sent by the control device based on an extended IGP.

The advertisement module 42 is specifically configured to: store, into a link state database, the link state information, which is included in the network topology information, between the first network device and the second network device; and for the current link state database, advertise a link state advertisement LSA, where the LSA includes the link state information between the first network device and the second network device and link state information between the first network device and another network device supporting the IGP.

A third application scenario is:

The network topology information further includes link state information between the first network device and another device supporting the IGP.

The advertisement module 42 is further configured to advertise the link state information, which is carried in the network topology information, between the first network device and the another network device supporting the IGP.

Optionally, the link state information advertisement device further includes: a routing calculation module 43.

The routing calculation module 43 is configured to preferentially perform routing calculation according to the link state information carried in the network topology information.

Optionally, the link state information advertisement device further includes: a determining module 44.

The determining module 44 is configured to: after the receiving module receives the network topology information sent by the control device and before the advertisement module advertises the link state information between the first network device and the second network device, determine that the identifier of the control device included in the received network topology information is the same as a locally stored identifier of the control device.

The extended IGP includes an extended router link state advertisement Router-LSA and an extended network link state advertisement Network-LSA.

It should be noted that the determining module is used in both the second scenario and the third scenario. However, the routing calculation module performs calculation in the third scenario according to the manner in this embodiment of the present application.

The link state information advertisement device in this embodiment of the present application may be a network element independent from a network device or a logic component integrated in a network device. This is not specifically limited herein.

The link state information advertisement device obtains, by using the control device, link state information between the link state information advertisement device and the second network device not supporting the IGP, and advertises the link state information to other network devices supporting the IGP, therefore implementing that a network device supporting the IGP in multiple network devices controlled by one control device accesses a network device not supporting the IGP, thereby optimizing routing between the multiple network devices controlled by the control device.

Embodiment 5

Figure 5:
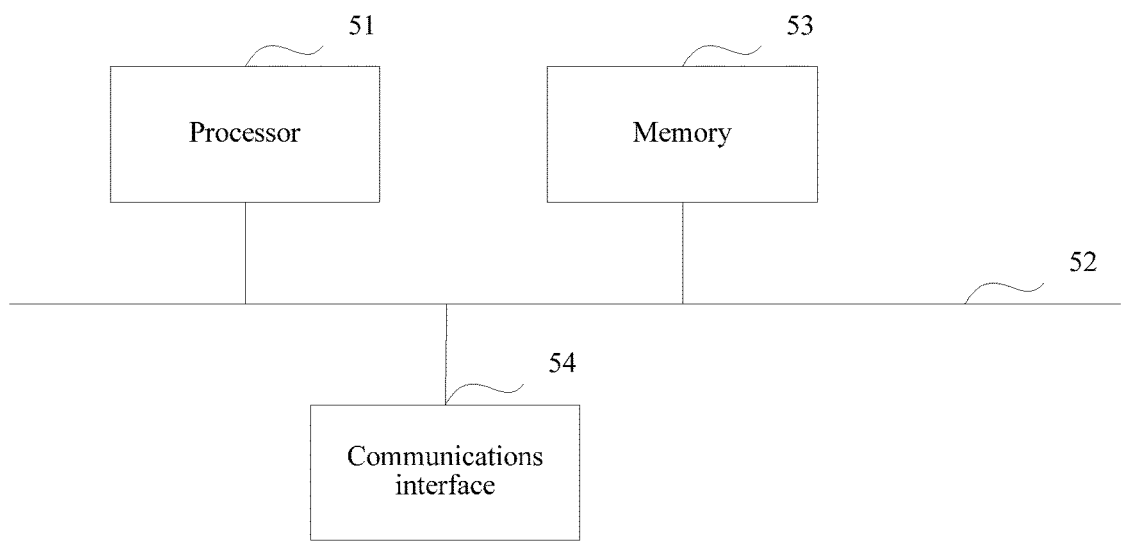
FIG. 5 is a schematic structural diagram of a link state information advertisement device according to Embodiment 5 of the present application.

As shown in FIG. 5, FIG. 5 is a schematic structural diagram of a link state information advertisement device according to Embodiment 5 of the present application. The link state information advertisement device has functions for executing Embodiment 1 of the present application to Embodiment 3 of the present application. The link state information advertisement device may use a general-purpose computer system structure, and a computer system may be specifically a processor-based computer. An entity of the link state information advertisement device includes at least one processor 51, a communications bus 52, a memory 53, and at least one communications interface 54.

The processor 51 may be a general-purpose central processing unit (CPU), a micro-processor, an application-specific integrated circuit (application-specific integrated circuit, ASIC), or one or more integrated circuits used to control execution of a program of a solution of the present application.

The communications bus 52 may include a passage for transmitting information between the foregoing components. The communications interface 54 uses any transceiver-type apparatus to communicate with other devices or communications networks, such as the Ethernet, a radio access network (RAN), and wireless local area networks (Wireless Local Area Networks, WLAN).

The computer system includes one or more memories 53, which may be a read-only memory (ROM) or another type of static storage device capable of storing static information and instructions, a random access memory (random access memory, RAM) or another type of dynamic storage device capable of storing information and instructions, or may be an electrically erasable programmable read-only memory (Electrically Erasable Programmable Read-Only Memory, EEPROM), a compact disc read-only memory (Compact Disc Read-Only Memory, CD-ROM), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. These memories are connected to the processor by using a bus.

The memory 53 is used to store application program code for executing the solution of the present application, and the application code for executing the solution of the present application is saved in the memory and is controlled to be executed by the processor 51. The processor 51 is used to execute an application program stored in the memory 53.

In one possible implementation manner, when the foregoing application program is executed by the processor 51, the following functions are implemented:

receiving network topology information sent by a control device, where the network topology information includes link state information, which is generated by the control device, between a first network device and a second network device, the first network device supports an interior gateway protocol IGP, and the second network device does not support the IGP; and advertising the link state information, which is carried in the network topology information, between the first network device and the second network device.

In one possible implementation manner, the processor 51 is specifically configured to:

store, into a link state database, the link state information, which is included in the network topology information, between the first network device and the second network device; and for the current link state database, advertise a link state advertisement LSA, where the LSA includes the link state information between the first network device and the second network device and link state information between the first network device and another network device supporting the IGP.

In one possible implementation manner, the processor 51 is specifically configured to:

receive the network topology information that is sent by the control device based on the Interface to the Routing System I2RS protocol.

Optionally, the network topology information further includes an identifier of the control device.

In one possible implementation manner, the processor 51 is specifically configured to:

receive the network topology information that is sent by the control device based on an extended IGP.

In one possible implementation manner, the processor 51 is specifically configured to:

store, into a link state database, the link state information, which is included in the network topology information, between the first network device and the second network device; and for the current link state database, advertise a link state advertisement LSA, where the LSA includes the link state information between the first network device and the second network device and link state information between the first network device and another network device supporting the IGP.

Optionally, the network topology information further includes link state information between the first network device and another device supporting the IGP.

In one possible implementation manner, the processor 51 is specifically configured to:

advertise the link state information, which is carried in the network topology information, between the first network device and another device supporting the IGP.

In one possible implementation manner, the processor 51 is specifically configured to:

preferentially perform routing calculation according to the link state information carried in the network topology information.

In one possible implementation manner, the processor 51 is specifically configured to:

after the signal receiver receives the network topology information sent by the control device and before the signal transmitter advertises the link state information between the first network device and the second network device, determine that the identifier of the control device included in the received network topology information is the same as a locally stored identifier of the control device.

The extended IGP includes an extended router link state advertisement Router-LSA and an extended network link state advertisement Network-LSA.

The link state information advertisement device obtains, by using the control device, link state information between the link state information advertisement device and the second network device not supporting the IGP, and advertises the link state information to other network devices supporting the IGP, therefore implementing that a network device supporting the IGP in multiple network devices controlled by one control device accesses a network device not supporting the IGP, thereby optimizing routing between the multiple network devices controlled by the control device.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A method of link state information advertisement, comprising:
    receiving, by a first network device, network topology information sent by a control device, wherein the network topology information comprises link state information, which is generated by the control device, between the first network device and a second network device, the first network device supports an interior gateway protocol (IGP), and the second network device does not support the IGP; and
    advertising, by the first network device, the link state information to another network device supporting the IGP, which is carried in the network topology information, between the first network device and the second network device.

2. The method according to claim 1, wherein the advertising, by the first network device, the link state information to another network device supporting the IGP between the first network device and the second network device comprises:
    storing, by the first network device into a link state database, the link state information, which is carried in the network topology information, between the first network device and the second network device; and
    for the current link state database, advertising, by the first network device, a link state advertisement (LSA), wherein the LSA comprises the link state information between the first network device and the second network device and link state information between the first network device and the another network device supporting the IGP.

3. The method according to claim 1, wherein the receiving, by a first network device, network topology information sent by a control device comprises:
    receiving, by the first network device, the network topology information that is sent by the control device based on an Interface to the Routing System (I2RS) protocol.

4. The method according to claim 1, wherein the network topology information further comprises an identifier of the control device; and
    the receiving, by a first network device, network topology information sent by a control device comprises:
    receiving, by the first network device, the network topology information that is sent by the control device based on an extended IGP.

5. The method according to claim 4, wherein the advertising, by the first network device, the link state information to another network device supporting the IGP between the first network device and the second network device comprises:
    storing, by the first network device into a link state database, the link state information, which is comprised in the network topology information, between the first network device and the second network device; and
    for the current link state database, advertising, by the first network device, a link state advertisement (LSA), wherein the LSA comprises the link state information between the first network device and the second network device and link state information between the first network device and the another network device supporting the IGP.

6. The method according to claim 4, wherein the network topology information further comprises link state information between the first network device and the another network device supporting the IGP; and
correspondingly, the method further comprises: advertising, by the first network device, the link state information, which is carried in the network topology information, between the first network device and the another network device supporting the IGP.

7. The method according to claim 6, wherein the method further comprises:
preferentially performing, by the first network device, routing calculation according to the link state information carried in the network topology information.

8. The method according to claim 4, after the receiving, by a first network device, network topology information sent by a control device, and before the advertising, by the first network device, the link state information to another network device supporting the IGP between the first network device and the second network device, further comprising:
determining, by the first network device, that the identifier of the control device comprised in the received network topology information is the same as a locally stored identifier of the control device.

9. The method according to claim 4, wherein the extended IGP comprises an extended router link state advertisement (Router-LSA) and an extended network link state advertisement (Network-LSA).

10. A device, comprising:
a receiving module, configured to receive network topology information sent by a control device, wherein the network topology information comprises link state information, which is generated by the control device, between the first network device and a second network device, the first network device supports an interior gateway protocol (IGP), and the second network device does not support the IGP; and
an advertisement module, configured to advertise the link state information to another network device supporting the IGP, which is carried in the network topology information and which is received by the receiving module, between the first network device and the second network device.

11. The device according to claim 10, wherein
the advertisement module is specifically configured to: store, by the first network device into a link state database, the link state information, which is carried in the network topology information, between the first network device and the second network device; and
for the current link state database, advertise a link state advertisement (LSA), wherein the LSA comprises the link state information between the first network device and the second network device and link state information between the first network device and the another network device supporting the IGP.

12. The device according to claim 10, wherein
the receiving module is specifically configured to receive the network topology information that is sent by the control device based on the Interface to an Routing System (I2RS) protocol.

13. The device according to claim 10, wherein the network topology information further comprises an identifier of the control device; and
the receiving module is specifically configured to receive the network topology information that is sent by the control device based on an extended IGP.

14. The device according to claim 13, wherein
the advertisement module is specifically configured to: store, into a link state database, the link state information, which is comprised in the network topology information, between the first network device and the second network device; and
for the current link state database, advertise a link state advertisement (LSA), wherein the LSA comprises the link state information between the first network device and the second network device and link state information between the first network device and the another network device supporting the IGP.

15. The device according to claim 13, wherein the network topology information further comprises link state information between the first network device and the another network device supporting the IGP; and
the advertisement module is further configured to advertise the link state information, which is carried in the network topology information, between the first network device and the another network device supporting the IGP.

16. The device according to claim 15, wherein the link state information advertisement device further comprises:
a routing calculation module, configured to preferentially perform routing calculation according to the link state information carried in the network topology information.

17. The device according to claim 13, wherein the link state information advertisement device further comprises: a determining module, wherein
the determining module is configured to: after the receiving module receives the network topology information sent by the control device and before the advertisement module advertises the link state information to another network device supporting the IGP between the first network device and the second network device, determine that the identifier of the control device comprised in the received network topology information is the same as a locally stored identifier of the control device.

18. The device according to claim 13, wherein the extended IGP comprises an extended router link state advertisement (Router-LSA) and an extended network link state advertisement (Network-LSA).

* * * * *